United States Patent [19]

Güttinger

[11] Patent Number: 4,465,950

[45] Date of Patent: Aug. 14, 1984

[54] SYNCHRON MOTOR

[75] Inventor: Kurt Güttinger, Murten, Switzerland

[73] Assignee: Sodeco-Saia SA, Geneva, Switzerland

[21] Appl. No.: 402,247

[22] Filed: Jul. 27, 1982

[30] Foreign Application Priority Data

Aug. 19, 1981 [CH] Switzerland ............... 5353/81

[51] Int. Cl.³ ............................................. H02K 21/00
[52] U.S. Cl. ................................... 310/162; 310/154; 310/197
[58] Field of Search ............... 310/49, 51, 162–164, 310/165, 154, 114, 153, 74, 194, 182, 183, 197, 266, 268, 41, 40 MM, 90

[56] References Cited

U.S. PATENT DOCUMENTS

| | | | |
|---|---|---|---|
| 2,982,872 | 5/1961 | Fredrickson | 310/163 |
| 3,517,237 | 6/1970 | Lloyd | 310/162 |
| 3,555,325 | 1/1971 | Inariba | 310/162 |
| 3,754,155 | 8/1973 | Oudet | 310/266 |
| 4,185,214 | 1/1980 | Geber | 310/51 |
| 4,324,995 | 4/1982 | Sakai | 310/153 |
| 4,363,984 | 12/1982 | Torii | 310/153 |

FOREIGN PATENT DOCUMENTS

| | | | |
|---|---|---|---|
| 159060 | 5/1904 | Fed. Rep. of Germany | 310/156 |
| 1488744 | 6/1973 | Fed. Rep. of Germany | 310/154 |
| 1505961 | 12/1966 | France | 310/156 |
| 260722 | 1/1970 | U.S.S.R. | 310/182 |

OTHER PUBLICATIONS

IBM Technical Disclosure Bulletin, vol. 9, No. 7, Dec. 1966.

*Primary Examiner*—R. Skudy
*Attorney, Agent, or Firm*—Wender Murase & White

[57] ABSTRACT

A synchronous motor which has a ring-shaped stator with a radially magnetized ring-shaped permanent magnet and an external housing of a material of high permeability to complete the magnetic circuit. At the inner side of this ring-shaped stator lies a rotor having a central core provided at its ends with pole rings of a material of high permeability. The coil of the motor is provided in the center of the stator and mounted between the pole rings. This construction gives rise to a high magnetic flux in the permanent magnet in the region of the poles of the rotor, which in turn, provides a high driving torque; while the rotor is made exclusively of material of high permeability, having a low weight and a low moment of inertia. Such motors, even when constructed to operate at relatively high power, are thus assured of positive starting.

11 Claims, 4 Drawing Figures

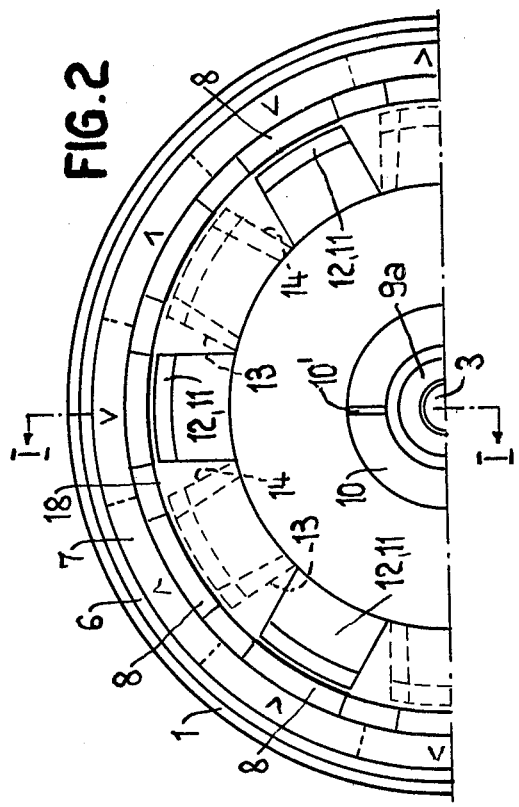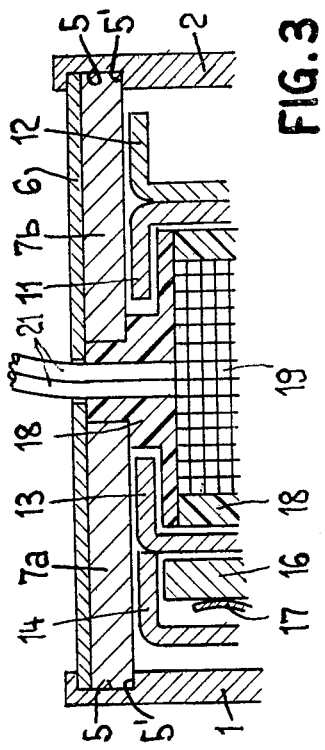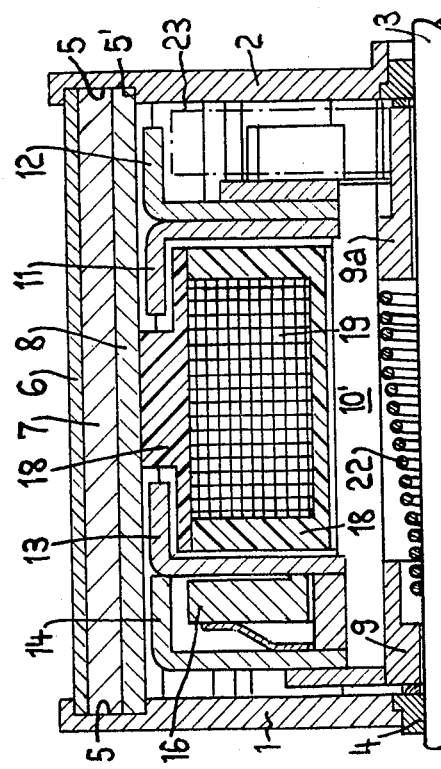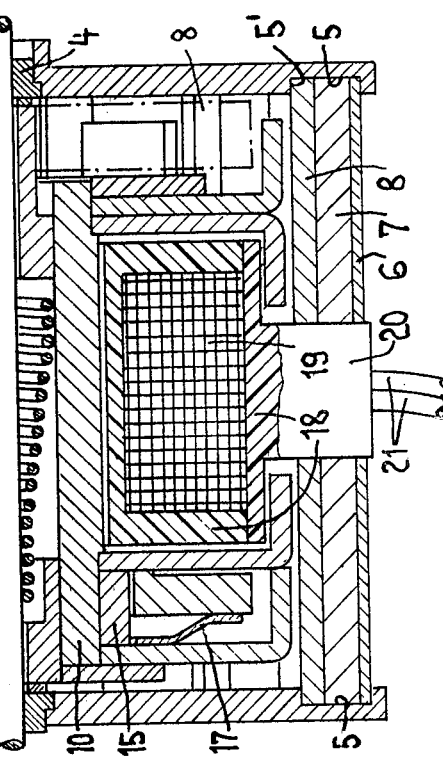

SYNCHRON MOTOR

BACKGROUND OF THE INVENTION

The present invention relates to a synchronous motor having a coil fastened at the inner side of a stator and a rotor carrying coil soft iron pole rings adjacent both sides of the coil, the pole rings being joined rigidly with a core of high permeability passing through the center of the coil, the pole rings facing permanent magnet poles of the stator.

Such synchronous of motors, also called stepping motors, generally are already known; e.g., from the West German printed specification No. 29 12 688 (FIG. 14) or from IBM Technical Disclosure Bulletin, vol. 9, no. 7, December 1966. The rotor of such motors consists of relatively light parts, so that it exhibits a small moment of inertia with respect to the driving moments acting upon it. This permits motors of relatively high power to be built with conventional dimensions. However, the high driving moments combined with the small moment of inertia of the rotor gives rise in its turn to instabilities at the start and even during the normal running of the motor.

It is therefore a feature of the present invention to construct a synchronous motor like the one described above with a minimum of expenditure of material and space, and capable of reliable and stable running in all conditions of operation.

SUMMARY OF THE INVENTION

The motor according to the invention is characterized that a metallic disc is loosely mounted on the rotor at least at one end of the core, the disc being mounted with a determined friction between two circumferentially shifted soft iron pole rings, the disc acting both as a damping disc and a short-circuiting disc for shifting of the magnetic flux.

As one of its functions disc produces a damping of the rotor in the sense that vibrations which give rise to instabilities are efficiently damped while the starting of the rotor is not excessively hindered. As a second function, the disc produces a shifting of the flux in at least one of the soft iron pole rings which improves the starting conditions. It is to be seen that a disc disposed between two pole rings represents a small expenditure of material and space while producing an optimum effect for achieving stable running conditions. If the disc is of iron it may also function to conduct magnetic flux.

The disc is preferably disposed between soft iron pole rings having pole shoes directed axially toward the center of the rotor. The radial flanges of these soft iron pole rings must in either case be displaced axially on the core of the rotor in order for the space between them to be utilized for accommodating the disc. This does not necessitate any lengthening of the motor.

The same arrangement with a damping and short-circuiting disc may be provided at both ends of the rotor. Preferably however, the arrangement is provided only at one end of the rotor while at the other end are provided soft iron pole rings with pole shoes directed axially in opposite directions, a locking device determining the sense of rotation of the rotor being provided within the region of the pole shoes directed toward the outside of the outer pole ring. This produces optimum space utilization with an optimum guidance of the magnetic flux.

The starting properties may be further improved if the rotor is rotatively mounted on its shaft, with a resilient coupling, more particularly a coil spring, being provided between the rotor and the shaft. This spring is preferably disposed within a hole defined by the hollow core of the rotor, and around the shaft where it passes through the hole.

A particularly simple and advantageous embodiment is obtained when a cylindrical coil spring is fastened at both ends on bushings, one of those seating into the hole of the hollow core of the rotor and the other to the shaft of the rotor. By an appropriate arrangement of this spring, the driving moment which is transmitted by it acts at both fastening places so as to wind up the spring which guarantees a slip-free coupling. One of the bushings which holds the coil spring may serve as a bearing bushing for the hollow core of the rotor, two of such bearing bushings being preferably provided.

The invention will be further described by way of example and with reference to the accompanying drawings.

BRIEF DESCRIPTION OF THE DRAWINGS

FIG. 1 is an axial sectional view of a preferred embodiment of the present invention taken along the line I—I in FIG. 2, FIG. 2 is a lateral view of the embodiment of FIG. 1 as seen from the right in FIG. 1, the bearing supporting flange being removed, FIGS. 3 and 4 are partial axial sectional views of two other embodiments, respectively, in accordance with the present invention.

DESCRIPTION OF THE PREFERRED EMBODIMENTS

Figure 4:
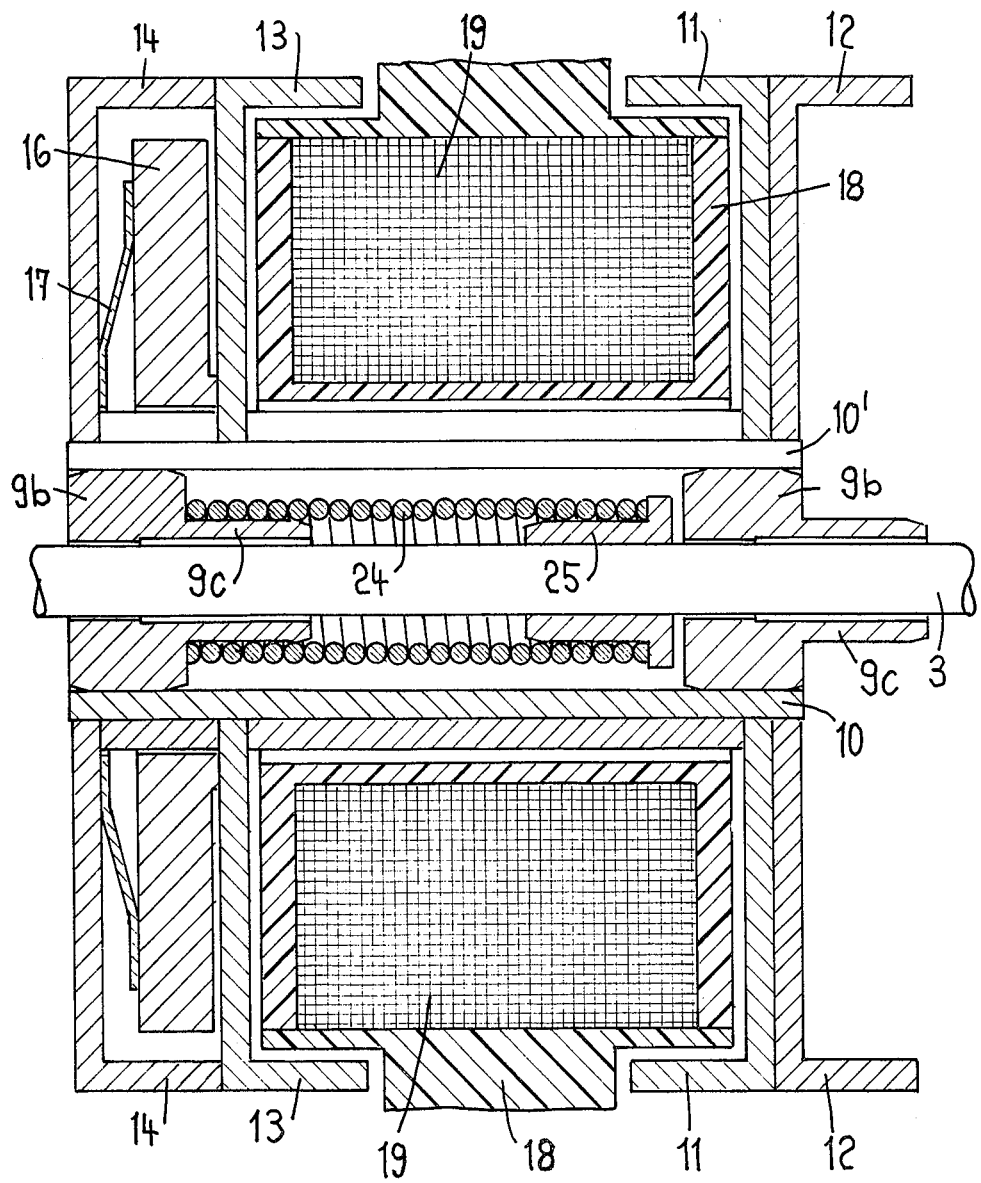

The motor comprises two bearing supporting flanges 1 and 2 in which the shaft of the motor is supported by bearings 4. Both flanges are provided on their inner surfaces with circular grooves 5. Parts 6, 7 and 8 of the stator are disposed within these grooves 5, these parts being an outer housing 6 of soft iron, an annular permanent magnet 7, e.g of barium ferrite bound by synthetic material, and at the inner side of this permanent magnet axially extending stator poles 8 of soft iron resting against the permanent magnet. The ends of the stator poles 9 lie against the inner ends 5' of the annular grooves 5 so that the stator poles are supported and secured in a precise radial position with respect to the rotor. As indicated in FIG. 2, the annular permanent magnet 7 is radially magnetized, such that north and south poles alternately appear in the soft iron poles 8.

A tubular rotor hub 10 preferably constructed of soft iron is rotatively supported by bearing bushings 9 and 9a on the shaft 3 of the rotor. The rotor hub has a longitudinal slit 10' cut therethrough which avoids eddy currents. Two paired rings of rotor poles 11, 12 and also 13, 14 are fixed one pair at each end of the hub 10. These pole rings are preferably indentical stamped parts of soft iron. The pole rings 11, 12 are disposed back to back with pole shoes oriented in opposite directions while the pole rings 13, 14 having pole shoes oriented toward the center of the rotor are disposed apart from each other by a determined distance by means of a spacer ring 15. Pole rings 13 and 14 are also referred to herein as inner and outer pole rings, respectively. The spacer ring 15 is preferably constructed of soft iron and it is not slit so that it acts as a short-circuiting ring. As shown in FIGS. 1 and 2, the poles 11 to 14 of the rotor have a shorter axial length than the poles 8 of the stator so that the surface of the poles of the rotor is substantially smaller than that of the poles of the stator and consequently also substantially smaller than the section of the magnetic flux in the permanent magnet 7. This magnetic flux is therefore concentrated by the soft iron poles 8 of the stator in the region of the poles 11-14 of the rotor, and this produces a substantially higher magnetic induction in the air gap as if the poles of the rotor were disposed directly facing the magnetized annular permanent magnet 7. As already mentioned, the poles 8 of the stator are held stable and accurately concentric in the annular grooves 5 of the bearing supporting flanges 1 and 2, which construction permits to observe tolerances. The air gap between the poles of the stator and those of the rotor may therefore be reduced from the conventional value of 0.5 mm to 0.3 or 0.4 mm.

In the region between the pole rings 13 and 14 is provided a damping disc 16 of brass or copper which may loosely rotate on the spacer ring 15. The disc 16 is pressed by a star-shaped spring 17 against the inner pole ring 13 so that a definite friction exists at the surface of contact between the damping ring 16 and the inner pole ring 13.

A spool 18 having a coil 19 of the stator lie between the pole rings 11 and 13 of the rotor. The coil defines a void for passage of the hub 10 therethrough. The spool is fixed in the center of the stator. An extension 20 of the spool permits interconnection of coil 19 with connecting wires 21. The pole rings 11 and 13 may be pulled over the spool toward the center of the motor, provided that enough space is left for the outlet of the connecting wires 21 through extension 20.

A coil spring 22 is disposed between the rotor hub 10 and the rotor shaft 3 in the hollow space between these parts, this spring acting as a resilient coupling therebetween, that is between the rotor and its shaft.

An open space 23 indicated in dot-and-dashes is available between the bearing supporting flange 2 and the pole ring 12 for an appropriate locking device determining the sense of rotation of the rotor. The inner ring 13, the spacer ring 15 and the damping disc 16 act as short-circuiting rings thus producing a phase shift of the flux in the poles of outer pole ring 14 of the rotor. These poles are consequently circumferentially shifted with respect to the poles of the inner pole ring 13 by the amount of the shifted flux e.g. 30°. This guarantees motor starting while the locking device prevents starting in the wrong direction.

The fundamental working of the motor, as far as not already mentioned above, corresponds to that of known synchronous motors of similar type. For this reason, in the following, only the particular conditions and the corresponding consequences distinguishing the present invention will be discussed. For manufacturing the ring-shaped stator, one starts preferably from at least one plate or one strip of workable permanent magnetic material, this plate or strip being shaped in the form of a cylinder or a segment of a cylinder. The poles 8 of the stator may be put on before or after bending and adhere sufficiently to the magnetized material for permitting subsequent assembly.

The mounts for suspension of the spool 18 to the stator require particular attention. As mentioned above, the radial position of the poles 8 of the stator with respect to the rotor is accurately determined by the inner shoulders 5' of the annular groves 5 against which the poles 8 are resting. For this reason, radial contact between the spool and stator poles due to radially outwardly-directed temperature expansion of the spool it must be avoided. To this end, the spool of the stator is given same play (not represented) in the stator, and it is oriented with respect to the latter with radial extensions only, e.g. four extensions which engage into recesses of the stator. The extension 20 for the outlet of the connecting wires may be one of these extensions. The spool could also be axially centered by spacer pieces which would extend axially between the poles 8 of the stator and abut to the bearing supporting flanges 1 and 2.

As noted above, the present invention seeks to realize a most favorable ratio between the torques acting on the rotor and the moment of inertia of the rotor. In this case, there exists a danger of instability of the motor, more particularly with a high efficiency, whereby for pulsation or stepping motor applications typical pendulum oscillations may arise. The damping disc 16 is provided for avoiding this danger. The moment of friction between this disc and the rotor should be so determined that in presence of the pendulum oscillations, losses of friction are produced which damp the rotor, thereby avoiding any inadmissible instabilities. Even at the normal running of the motor, the damping disc can still have a slight damping effect so that a certain slip is present between the rotor and the damping disc during variations of the number of turns of the rotor which occur with twice the power supply frequency. The moment of friction may have a value of e.g. 1 to 5% of the peak driving moment.

The above mentioned pendulum oscillations may under well determined conditions have the effect that the motor does not start. This danger may be avoided in that a locking pawl is so determined that its bounce frequency does not correspond with the power supply frequency or that of the above mentioned pendulum oscillation or the oscillation of rotation of the rotors. Under these circumstances, the locking pawl is not absolutely effective for each possible locking position so that it permits the rotor to come out of a stable pendulum oscillation and to start definitively.

A reliable starting of the motor is further guaranteed by the spring 22 disposed between the rotor and the shaft of the latter. The motor can start and gradually accelerate a load independently from the external conditions of load, that is from the moment of inertia of an outer system coupled with the shaft 3. This may even occur in a stepping manner in which the motor starts until the torque transmitted by the spring 22 becomes greater than the driving moment and the motor stands still until it may start to rotate again.

The embodiment of FIG. 3 is different from the one of FIG. 1 principally in that soft iron poles are not disposed at the inner side of the annular permanent magnet. The permanent magnet is instead divided into two rings 7a and 7b which in turn are supported on the one hand by the inner shoulders 5' of the grooves 5 and on the other hand by the outer ring of the spool 18. In order to utilize as much as possible of the flux of the permanent magnets 7a and 7b, the poles of the pole rings 11 to 14 may be constructed slightly longer than in the embodiment of FIGS. 1 and 2. Due to the lack of the soft iron poles 8, the manufacture of the motor may be simplified and the cost may be reduced, however at the cost of a power loss.

Different variants are possible. The indicated solutions are not only interesting for small synchronous motors having a particularly high power and high efficiency but they may be utilized also for smaller motors the working conditions of which being less critical. Correspondingly determined auxiliary features may be deleted like the spring which is disposed between the rotor and the shaft 3 or a similar resilient coupling. It is also possible to bring out the connections of the coil between two adjacent poles 8 of the stator and through one of the bearing supporting flanges instead of radially toward the outside. In this case it would be also possible, instead of a cylindrically bent outer housing 6, to provide a multiple layer winding of thin soft iron metal sheet as a magnetic circuit closing piece.

FIG. 4 shows another embodiment in which corresponding elements are designated by the same references as in the other figures and not further described. Instead of bearings 9 and 9a of different shape, the core 10 of FIG. 4 is supported on the shaft 3 by two identical bearing bushings 9b, each provided with a tapered extension 9c. The extension 9c directed toward the center of the motor of one of the bearings serves to hold one end of a coil spring 24 the other end of which being attached to a bushing 25 attached firmly to the shaft. This construction permits the use of a simple coil spring, and the assembly of the latter is easy. The torque to be transmitted may have at both ends of the spring a contracting of winding-up effect which ensures a reliable transmission of torque without slip. The extension 9c directed toward the outside of the other bearing bushing 9b may serve for the assembly of part of the not represented locking device for determining the direction of rotation.

What I claim:

1. A synchronous motor comprising:
   a stator having a coil defining a void, and permanent magnet poles; and
   a rotor having a tubular rotor hub disposed in said coil void, said tubular hub having axial ends, a pair of pole rings connected to each axial end of said tubular hub said pairs of pole rings being disposed for cooperation with said permanent magnet poles, one pole ring of at least one of said pairs of pole rings being axially spaced and circumferentially shifted relative to the other pole ring of said pair, said pole ring of said axially-spaced pair closest to the end of said tubular hub being the outer pole ring and the other ring of said axially-spaced pair being the inner pole ring, and electrically-conducting disc means frictionally and rotatively mounted on said rotor between said pole rings of said axially-spaced pair for damping rotor oscillation and for acting as a loading element for phase-shifting magnetic flux generated in said outer pole ring.

2. The motor according to claim 1, wherein both of said pole rings between which said disc means is mounted have pole shoes directed axially toward the center of the rotor.

3. The motor according to claim 2, wherein at one end of said hub is disposed soft iron pole rings having pole shoes directed axially toward the center of the rotor, said disc means being disposed between said pole rings and wherein at the other end of said hub is provided two pole rings having pole shoes directed axially in opposite directions, a device determining the sense of rotation of said rotor being provided at said other end of said hub in the region defined by the pole shoes of the pole ring closest to said other end of said core.

4. The motor according to claim 1, wherein said disc means has mass and generates a moment of friction during rotation, the mass of said disc means on said rotor and the moment of friction are so optimized that pendulum oscillations of the motor are damped and the motion of the rotor is stabilized.

5. The motor according to claim 1, wherein all pole rings of said rotor are of identical construction.

6. The motor according to claim 1, wherein said disc means has a disc that is constructed of iron.

7. The motor according to claim 1, wherein said tubular hub rotatively supported on a shaft of said motor, a resilient coupling being provided between said hub and said shaft.

8. The motor according to claim 7, wherein said resilient coupling is a cylindrical coil spring mounted at one side on a bushing attached to said tubular hub and at the other side on a bushing attached to said motor shaft.

9. The motor according to claim 8, wherein two identical bearing bushings each provided with a tapered projection are fastened into said tubular hub, said tubular hub being supported on said shaft by said bearing bushings and one end of said coil spring being attached to the projection of one of said bearing bushings.

10. A synchronous motor comprising:
    a stator having a coil defining a void, and permanent magnet poles;
    a rotor having a tubular rotor hub disposed in said coil void, said tubular hub having axial ends, a pair of pole rings connected to each axial end of said tubular hub said pairs of pole rings being disposed for cooperation with said permanent magnet poles, one pole ring of at least one of said pairs of pole rings being axially spaced and circumferentially shifted relative to the other pole ring of said pair, said pole ring of said axially-spaced pair closest to the end of said tubular hub being the outer pole ring and the other ring of said axially-spaced pair being the inner pole ring, electrically-conducting disc means rotatively mounted on said rotor between said pole rings of said axially-spaced pair for acting as a loading element for phase-shifting magnetic flux generated in said outer pole ring; and
    a spring cooperating with said disc means and one of said pole rings of said axially-spaced pair, said spring axially biasing said cooperating disc means and pole ring for creating friction in order to damp rotor oscillation.

11. A synchronous motor comprising:
    a stator having a coil defining a void, and permanent magnet poles;
    a rotor having a tubular rotor hub disposed in said coil void, said tubular hub having axial ends, a pair of pole rings connected to each axial end of said tubular hub said pairs of pole rings being disposed for cooperation with said permanent magnet poles, one pole ring of at least one of said pairs of pole rings being axially spaced and circumferentially shifted relative to the other pole ring of said pair, said pole ring of said axially-spaced pair closest to the end of said tubular hub being the outer pole ring and the other ring of said axially-spaced pair being the inner pole ring, an electrically-conducting disc means frictionally and rotatively mounted on said rotor between said pole rings of said axially-spaced pair for damping rotor oscillation and for acting as a loading element for phase-shifting magnetic flux generated in said outer pole ring; and
    a pair of bearing bushings rotationally mounting said tubular hub on a shaft, said bearing bushings having inwardly-directed tapered projections, a helical spring disposed between said shaft and said tubular hub, one end of said helical spring being attached to one of said projections and the other end of said helical spring being coupled to said shaft.

* * * * *